US008045100B2

(12) United States Patent
Kim et al.

(10) Patent No.: US 8,045,100 B2
(45) Date of Patent: Oct. 25, 2011

(54) OPTICAL SHEET AND DISPLAY APPARATUS HAVING THE SAME

(75) Inventors: Joong-Hyun Kim, Suwon-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 399 days.

(21) Appl. No.: 11/488,243

(22) Filed: Jul. 18, 2006

(65) Prior Publication Data

US 2007/0188678 A1  Aug. 16, 2007

(30) Foreign Application Priority Data

Feb. 16, 2006 (KR) .................. 10-2006-0014965

(51) Int. Cl.
G02F 1/1333 (2006.01)
G02F 1/1335 (2006.01)
(52) U.S. Cl. .......................................... 349/96; 349/104
(58) Field of Classification Search .................. 349/115, 349/106, 98
See application file for complete search history.

(56) References Cited

U.S. PATENT DOCUMENTS

| 6,339,501 | B1* | 1/2002 | Kameyama et al. ........... 359/485 |
| 6,573,961 | B2* | 6/2003 | Jiang et al. .................... 349/115 |
| 6,738,118 | B2* | 5/2004 | Hwang et al. ................. 349/119 |
| 6,833,884 | B2* | 12/2004 | Kim et al. ......................... 349/62 |
| 7,411,641 | B2* | 8/2008 | Hu et al. .......................... 349/96 |
| 7,423,707 | B2* | 9/2008 | Yoon ................................ 349/96 |
| 2003/0086169 | A1* | 5/2003 | Kawamoto et al. ........... 359/485 |
| 2003/0197820 | A1* | 10/2003 | Hiji et al. ....................... 349/115 |
| 2004/0008302 | A1* | 1/2004 | Moon ............................. 349/115 |
| 2004/0095531 | A1* | 5/2004 | Jiang et al. .................... 349/115 |
| 2005/0140894 | A1* | 6/2005 | Yoon .............................. 349/139 |

FOREIGN PATENT DOCUMENTS

| JP | 09-506984 A | 7/1997 |
| JP | 09-304770 A | 11/1997 |
| JP | 11-052363 A | 2/1999 |
| JP | 11-326887 A | 11/1999 |
| JP | 2000-066139 A | 3/2000 |
| JP | 2003-149632 A | 5/2003 |

\* cited by examiner

Primary Examiner — Mark Robinson
Assistant Examiner — Mary A El Shammaa
(74) Attorney, Agent, or Firm — Cantor Colburn LLP (57) ABSTRACT

An optical sheet includes a reflective polarizer and a filter layer. The reflective polarizer reflects a part of incident light and transmits another part of the incident light. The filter layer selectively reflects the transmitted light passed through the reflective polarizer. The filter layer reflects at least one of a first wave band that is an overlapped area between a green peak and a blue peak in the spectrum of incident light, and a second wave band that is an overlapped area between a green peak and a red peak in the spectrum of incident light.

22 Claims, 6 Drawing Sheets

OPTICAL SHEET AND DISPLAY APPARATUS HAVING THE SAME

This application claims priority to Korean Patent Application No. 10-2006-0014965, filed on Feb. 16, 2006 and all the benefits accruing therefrom under 35 U.S.C. §119, and the contents of which in its entirety are herein incorporated by reference.

BACKGROUND OF THE INVENTION

1. Technical Field

The present disclosure relates to an optical sheet and display device having the optical sheet.

2. Discussion of the Related Art

Liquid crystal display (LCD) is one of display devices which use liquid crystal. Compare to the other display devices, LCD has the advantages such as thin, light, using low driving voltage and low power consumption so that LCD is widely used in industry.

Conventional LCD needs a liquid crystal panel having color filters to implement color and CCFL (Cold Cathode Florescent lamp) lamp to provide light to the liquid crystal panel.

When the white light from the lamp transmits through color filters, the spectrum of the light has three peaks corresponding to colored light, such as to each color like red, green and blue. However, the spectrum of each color is overlapped each other except for the relative middle area of the peak.

Thus, except for the middle area of each color peak, side areas of each color peak are overlapped with each other and show mixed color. This makes color reproduction decrease.

BRIEF SUMMARY OF THE INVENTION

An exemplary embodiment of an optical sheet includes a reflective polarizer and a filter layer. The reflective polarizer reflects part of incident light and transmits another part of the incident light. The filter layer selectively reflects the transmitted light passed through the reflective polarizer.

In another exemplary embodiment, the filter layer reflects at least one of a first wave band that is an overlapped area between a green peak and a blue peak in the spectrum of incident light and a second wave band that is an overlapped area between the green peak and a red peak in the spectrum of incident light. The first wave band is about 470 nm to about 530 nm and the second wave band is about 572 nm to about 605 nm.

Another exemplary embodiment provides a display device including a light source, an optical sheet, a display panel, a top polarizer disposed on a top of the display panel and a bottom polarizer disposed on a bottom of the display panel. The optical sheet includes a reflective polarizer transmitting a part of incident light from the light source and a filter layer selectively reflecting about 470 nm to about 530 nm and about 572 nm to about 605 nm wave length of said transmitted light passed through said reflective polarizer.

BRIEF DESCRIPTION OF THE DRAWINGS

Preferred embodiments of the present invention can be understood in more detail from the following descriptions taken in conjunction with the accompanying drawings, in which.

DETAILED DESCRIPTION OF THE INVENTION

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Certain layers and regions may be exaggerated for clarity.

It will be understood that when an element is referred to as being "on" and "under' another element, it can be directly on and under the other element or intervening elements may be present there between. In contrast, when an element is referred to as being "directly on" and "directly under" another element, there are no intervening elements present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "under," "over" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

In an exemplary embodiment, an optical sheet includes a reflective polarizer and a filter layer. The reflective polarizer transmits the first linear polarized light and reflects the second linear polarized light which is perpendicular to the first linear polarized light. The reflective polarizer and the filter layer have a plurality of relatively thin layers with different refractive indices. The transmission axis of the filter layer is perpendicular to the transmission axis of the reflective polarizer. The filter layer is disposed on one of the surfaces of the reflective polarizer.

In another exemplary embodiment, an optical sheet includes a reflective polarizer and a cholesteric liquid crystal layer. The cholesteric liquid crystal layer reflects a part of incident light and transmits the other part of the incident light depending on the wave length of incident light. The filter layer has a transmission circular polarizing axis that is reverse to a transmission circular polarizing axis of the reflective polarizer. The optical sheet further includes a phase shift film that changes circular polarized light to linear polarized light. The reflective polarizer and the filter layer may be separated each other.

Another exemplary embodiment provides a display device including a lamp that generates light, an optical sheet and a display panel. The optical sheet includes a reflective polarizer that reflects a part of incident light and transmits the other part of the incident light and a filter layer that reflects selectively the light passed through the reflective polarizer having the wave length between about 470 nm and 530 nm or between about 572 nm and 605 nm. The display device displays images using the light passed through the optical sheet, and further includes a pair of polarizers disposed on the outer surfaces of the display panel.

In one exemplary embodiment of the display device with the optical sheet, the color overlapped area between a green peak and a blue peak in the spectrum of incident light or between a green peak and a red peak in the spectrum of incident light is filtered by the optical sheet. Advantageously, the display device displays images with high color reproduction.

Hereinafter, the illustrative embodiments of the present invention will be described in detail with reference to the accompanying drawings.

Figure 1:
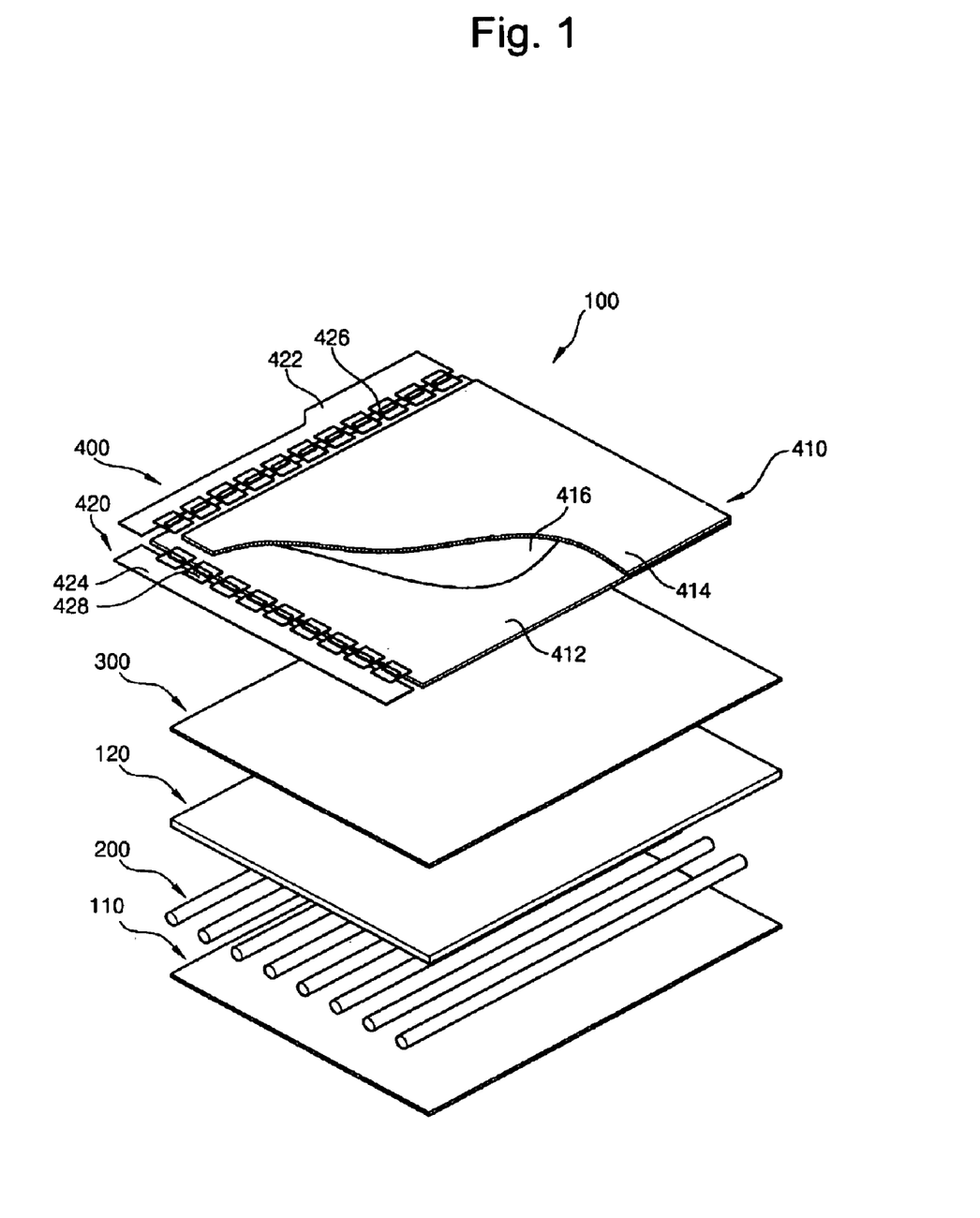
FIG. 1 is an exploded view of an exemplary embodiment of a display device according to the present invention.
Figure 2:
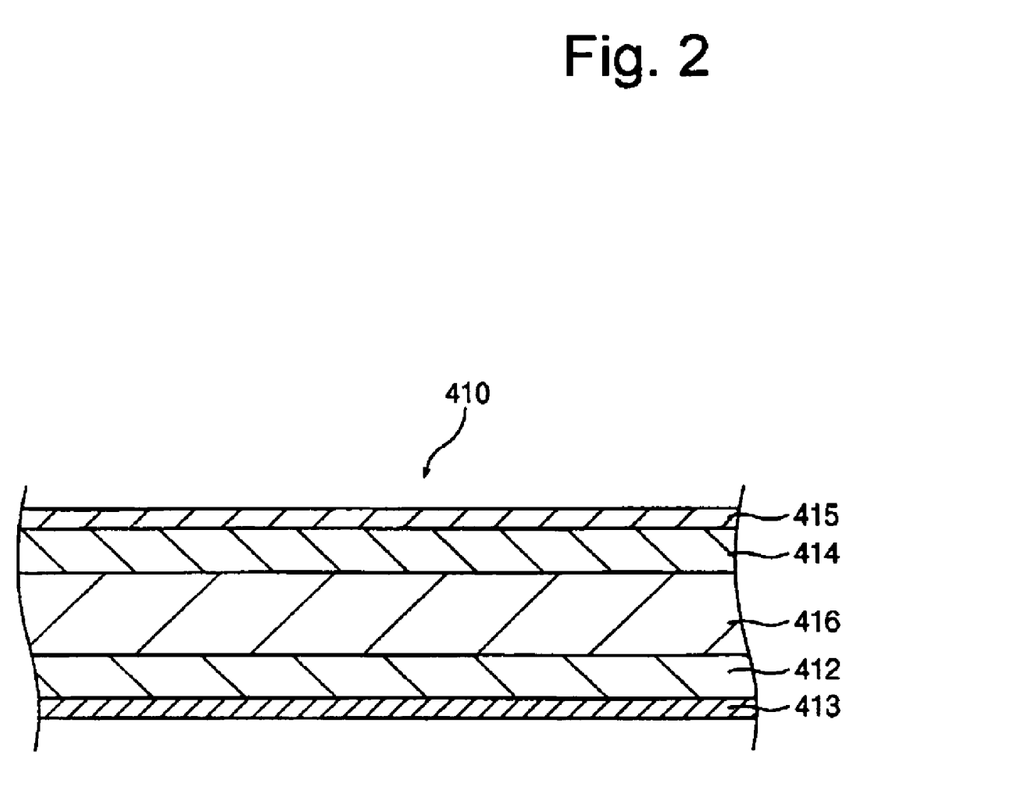
FIG. 2 is a cross-sectional view of an exemplary embodiment of the display device shown in FIG. 1.

FIG. 1 is an exploded view of a display device according to the present invention and FIG. 2 is a cross-sectional view of an exemplary embodiment of the display device shown in FIG. 1.

With the reference of FIG. 1 and FIG. 2, a display device 100 includes a light source 200 that generates light, an optical member 300 disposed on the light source 200 and a display unit 400 disposed on the optical member 300. In one exemplary embodiment, the light source may be a fluorescent lamp and/or the optical member may be an optical sheet.

The fluorescent lamp 200 is positioned under the optical sheet 300 and the display unit 400, and generates white light corresponding to the driving voltage driven by an inverter (not shown in FIG. 1 and FIG. 2). In exemplary embodiments, fluorescent material may be disposed on inner surfaces of the fluorescent lamp 200. The electric discharge of the lamp 200 generates ultraviolet (UV) rays or light. The generated ultraviolet rays hit the fluorescent material such that white light is transmitted from the fluorescent lamp 200.

In one exemplary embodiment, the fluorescent lamp 200 may be a CCFL (Cold Cathode Fluorescent lamp) that has a thin and long cylinder shape. In another exemplary embodiment, the fluorescent lamp 200 may be an EEFL (External Electrode Fluorescent Lamp) that includes external electrodes disposed at the edge of the lamp 200. In alternative exemplary embodiments, the lamp 200 may have a substantially U-shape or bent structure.

In one exemplary embodiment, the optical sheet 300 may include a reflective polarizer and/or a filter layer. The reflective polarizer reflects a part of incident light and transmits the other part of incident light depending on the wavelength of the incident light. As the incident light is not absorbed but reflected, the reflected light is essentially recycled. Advantageously, the effectiveness of using the incident light and the brightness of the display device 100 may be increased.

The filter layer selectively reflects the light with a specific part of a wavelength that penetrates the reflective polarizer. The filter layer increases the color reproduction of the display device 100 by reflecting at least one of the first wave band that is included in the overlapped area between a blue peak and a green peak, and the second wave band that is included in the overlapped area between a green peak and a red peak. One exemplary embodiment includes the filter layer reflecting the light having the wave length between about 470 nm and 530 nm and between about 572 nm and 605 nm.

The display unit 400 displays images by using the light that penetrates the optical sheet 300. The display panel 400 includes a display panel 410 that substantially shows images and a driving circuit part 420 that drives the display panel 410.

The display panel 410 includes first substrate 412 and second substrate 414 facing each other. The display panel 410 includes a liquid crystal layer 416 between the first substrate 412 and second substrate 414.

A TFT (Thin Film Transistor) (not shown) may be disposed on the first substrate 412. Color filters (not shown) may be disposed on the second substrate 414. The color filters may include R, G, B color filters (Red, Green, Blue color filters) disposed on the second substrate 414.

The driving circuit part 420 includes a data printed circuit board 422 that provides data signals to the display panel 410, a gate printed circuit board 424 that provides gate signals to the display panel 410, a data driving circuit film 426 that connects the data printed circuit board 422 to the display panel 410 and a gate driving circuit film 428 that connects the gate printed circuit board 424 to the display panel 410. In one exemplary embodiment, the data driving circuit film 426 and the gate driving circuit film 428 constitute a TCP (Tape Carrier Package) or COF (Chip On Film). In an alternative exemplary embodiment, the gate and/or data printed circuit boards 424 and 422 may be omitted by using a specific signal line on the gate and/or data driving circuit film 428 and 426 or the display panel 410.

Referring again to FIG. 2, the display panel 410 further includes a bottom polarizer 413 that is disposed on the bottom side surface of the first substrate 412 and a top polarizer 415 that is disposed on the top side surface of the second substrate 414. The bottom polarizer 413 and top polarizer 415 have a transmission axis and an absorbing axis that is substantially perpendicular to the transmission axis. The bottom polarizer 413 and top polarizer 415 transmit the light that vibrates along the direction of the transmission axis and absorb the light that vibrates along the perpendicular direction to the direction of the transmission axis. In one exemplary embodiment, the transmission axis of the bottom polarizer 413 is crossed (or perpendicular) with the transmission axis of the top polarizer 415.

Referring again to FIG. 1, the display device 100 further includes a reflection layer 110 disposed under the fluorescent lamp 200 and a diffusion layer 120 disposed over the fluorescent lamp 200. In one exemplary embodiment, the reflection layer may be a reflective plate and the diffusion layer may be a diffuser plate.

The reflection plate 110 reflects the light generated from the lamp 200 and the light reflected by the optical sheet 300 so that the effectiveness of using the incident light is increased.

The diffuser plate 120 spreads the incident light so that the uniformity of brightness is increased. In one exemplary embodiment, a thickness of the diffuser plate 120 may be larger than that of the optical sheet 300 thereby reducing or effectively preventing the thinner optical sheet 300 from being slack.

In other exemplary embodiments, the display device 100 may further include a light gathering sheet and/or a light diffusing sheet, not shown in FIG. 1 and FIG. 2.

FIG. 1 shows a direct-light type display device with the lamp 200 positioned under the display panel 410. In an alternative exemplary embodiment, an edge-light type display device whereby a light guiding plate is disposed under the display panel 410 and the lamp 200 is positioned at the edge of the light guiding plate, may also be used.

Figure 3:
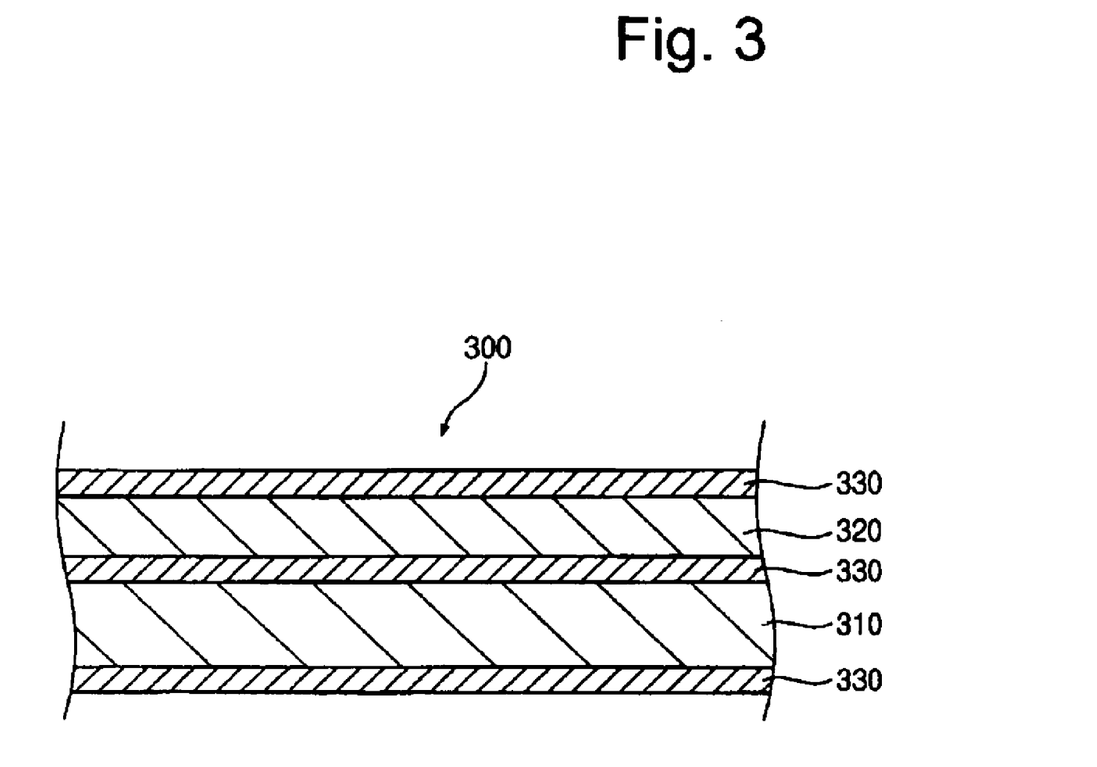
FIG. 3 is a cross-sectional view of an exemplary embodiment of the optical sheet shown in FIG. 1.

FIG. 3 is a cross-sectional view of an exemplary embodiment of the optical sheet 300 shown in FIG. 1.

With reference to FIGS. 1-3, the optical sheet 300 includes a reflective polarizer 310 that transmits part of incident light and reflects the other part of incident light, and a filter layer 320 that selectively reflects the transmitted light passed through the reflective polarizer 310 depending on the wave length of the transmitted light. The reflective polarizer 310 and/or the filter layer 320 may have a plural of relatively thin layers with different refractive indices. In exemplary embodiments, the number of the thin layers of the reflective polarizer 310 and/or the filter layer may range from hundreds of layers to thousands of layers.

The reflective polarizer 310 has a transmission axis and a reflection axis crossed (or substantially perpendicular) with the transmission axis. The reflective polarizer 310 transmits the first linear polarized light that only vibrates along the direction of the transmission axis and reflects the second linear polarized light that vibrates along the direction of the transmission axis among a specific wave length area, such as between about 250 nm and 800 nm.

The second linear polarized light reflected by the reflective polarizer 310 enters again to the reflective polarizer 310 by being reflected from the reflection plate 110. With the repetition of this process, most of light generated by the fluorescent lamp 200 is transmitted to the reflective polarizer 310.

To increase the effectiveness of using the incident light, the transmission axis of the reflective polarizer 310 of the optical sheet 300 has the same direction to the transmission axis of the bottom polarizer 413 of the display panel 410.

The light passed through the reflective polarizer 310 is spread into a spectrum from red through green to blue. The peak of blue is in between about 430 nm and 460 nm. The peak of green is in between about 540 nm and 550 nm. The peak of red is between about 610 nm and 620 nm. However, the light passed through the reflective polarizer 310 has a blue and green spectrum between the blue peak and the green peak, and the green and red spectrum between the green peak and the red peak as well. The overlapped areas decrease the color reproduction of the display device.

In an exemplary embodiment, the filter layer 320 reflects selectively the light passed through the reflective polarizer 310 depending on the wave length of the light. In more detail, the filter layer 320 reflects at least one of a first wave band that is an overlapped area between green peak and blue peak in the spectrum of incident light and a second wave band that is an overlapped area between green peak and red peak in the spectrum of incident light. In one exemplary embodiment, the first wave band has a wave length between about 470 nm and about 530 nm and the second wave band has a wave length between about 572 nm and about 605 nm.

As illustrated in FIG. 3, the filter layer 320 is positioned over the reflective polarizer 310. In alternative exemplary embodiments, the filter layer 320 may be under the reflective polarizer 310.

The optical sheet 300 may further include a protection layer 330 that protects the reflective polarizer 310 and/or the filter layer 320. In exemplary embodiments, the protection layer 330 may be located under the reflective polarizer 310, over the filter layer 320 and/or in between the reflective polarizer 310 and the filter layer 320. In one exemplary embodiment, the protection layer 330 is attached to the reflective polarizer 310 and/or the filter layer 320 by an ultraviolet hardening glue. In other exemplary embodiments, the reflective polarizer 310 and the filter layer 320 may be separate into independent or different sheets as well.

Figure 4:
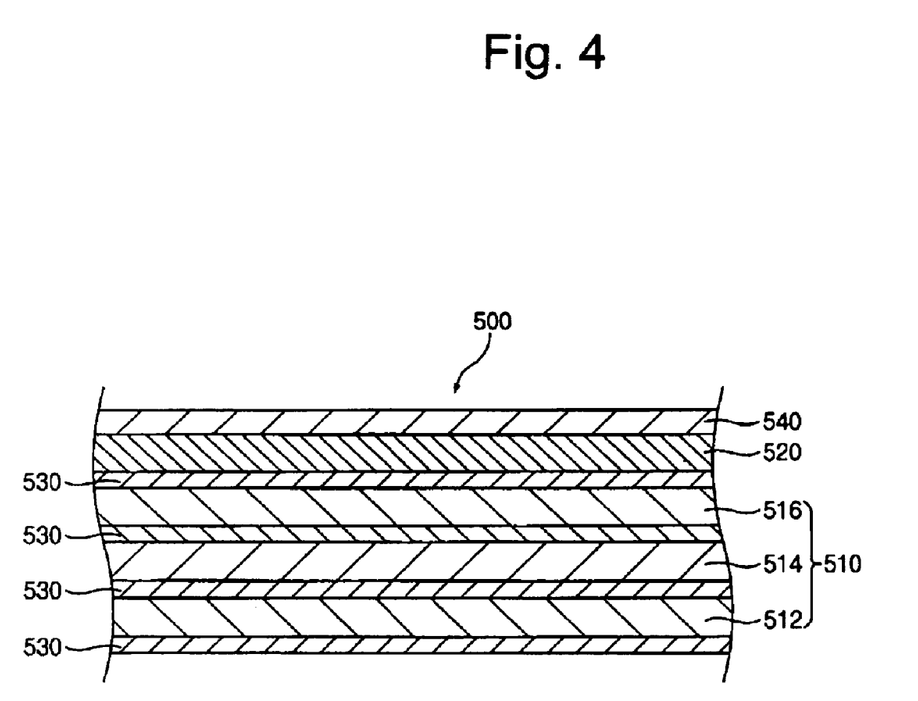
FIG. 4 is a cross-sectional view of another exemplary embodiment of the optical sheet shown in FIG. 1.
Figure 5:
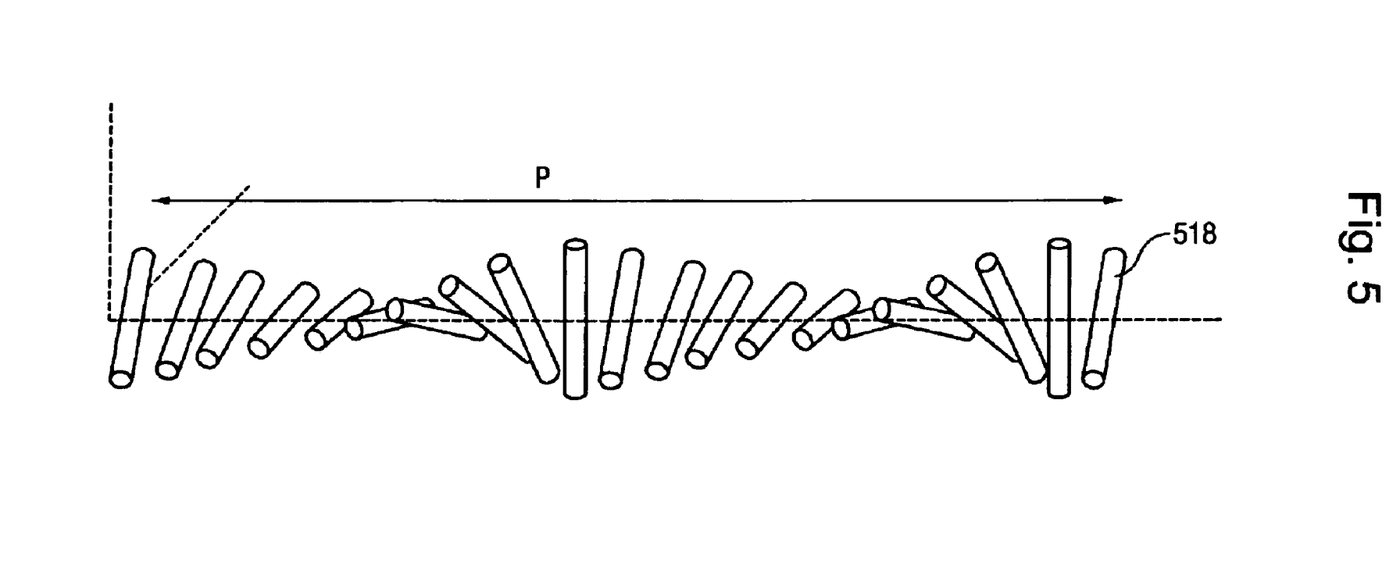
FIG. 5 is a view showing an exemplary embodiment of the liquid crystal layer shown in FIG. 4.

FIG. 4 is a cross-sectional view of another exemplary embodiment of the optical sheet shown in FIG. 1 and FIG. 5 is a view showing an exemplary embodiment of the liquid crystal layer shown in FIG. 4.

With reference to FIG. 4 and FIG. 5, the optical sheet 500 includes a reflective polarizer 510 and a filter layer 520 disposed on the reflective polarizer 510. The optical sheet 500 includes a liquid crystal layer 518 that reflects part of incident light and transmits the other part of incident light. The liquid crystal layer 518 may include a cholesteric liquid crystal (CLC).

In more detail, the reflective polarizer 510 includes a first liquid crystal layer 512, a second liquid crystal layer 514 and a third liquid crystal layer 516. In one exemplary embodiment, the first, second and third liquid crystal layers 512, 514 and 516, respectively, may be an ultraviolet hardening liquid crystal material that is formed by coating monomer material to a substrate and followed by polymerization with ultraviolet ray.

Shown in FIG. 5, the first, second and third liquid crystal layers (512, 514, and 516) are illustrated as a liquid crystal phase, so called cholesteric liquid crystal 518, whereby molecules of liquid crystal are twisted in helical structure. The cholesteric liquid crystal layer 518 repeats the helical structure with a pitch (P).

In exemplary embodiments, the first, second and third liquid crystal layers (512, 514, 516) may have a different pitch from each other. In one exemplary embodiment, the first liquid crystal layer 512 has the pitch corresponding to the wave length of red light, the second liquid crystal layer 514 has the pitch corresponding to the wave length of green light and the third liquid crystal layer 516 has the pitch corresponding to the wave length of blue light. Each of the liquid crystal layers strongly reflects the incident light that has the wave length corresponding to its pitch and transmits the incident light that has another wave length that doesn't correspond to its pitch. The light reflected by the first, second and third liquid crystal layers (512, 514, 516) becomes a left circular polarizing light or a right circular polarizing light depending on the direction of twisted molecules of cholesteric liquid crystal 518. However, the light passed through the first, second and third liquid crystal layers (512, 514, and 516) becomes a reverse direction circular polarizing light comparing to the reflected light.

The light reflected by the reflective polarizer 510 is reflected again by the reflection plate 110 and then enters into the reflective polarizer 510 again. With the repetition of this process, most of light penetrates the reflective polarizer 510 with the same circular polarizing direction.

In an exemplary embodiment, the reflective polarizer 510 may further include a plurality of liquid crystal layers to essentially cover all wavelengths of visible light or ray.

The filter layer 520 selectively reflects the light passed through the reflective polarizer 510 depending on the wavelength. To reflect the circular polarizing light passed through the reflective polarizer 510, the direction of the transmission axis of the filter layer 520 is reverse to that of the transmission axis of the reflective polarizer 510.

In exemplary embodiments, the filter layer 520 reflects at least one of the first wave band that is the overlapped area between the blue peak and the green peak, and the second wave band that is the overlapped area between the green peak and the red peak. In one exemplary embodiment, the first wave band has the wavelength between about 470 nm and 530 nm and the second wave band has the wavelength between about 572 nm and 605 nm. Advantageously, the filtering function of the filter layer 520 increases the color reproduction of the display device.

The optical sheet 500 further includes a protection layer 530 that protects the reflective polarizer 510 and the filter layer 520. The protection layer 530 may be located under the first liquid crystal layer 512 and/or in between the liquid crystal layers 512, 514 and 516. The protection layer 530 may also be disposed on the filter layer 520. In one exemplary embodiment, the protection layer 530 is made of PET (Poly Ethylene Terphthalate) material. The reflective polarizer 510 and the filter layer 520 may be separated into different sheets by the protection layer(s) 530.

When the circular polarizing light passed through the reflective polarizer 510 and the filter layer 520 and enters into the display panel 410, light loss may be caused by the bottom polarizer 413, such as a linear polarizer. The optical sheet 500 may further include a phase shift layer 540 that changes circular polarizing light to linear polarizing light. In one exemplary embodiment, the phase shift layer 540 is a λ/4 phase shift film. The polarizing axis of the linear polarizing light by the phase shift layer 540 is parallel to the transmission axis of the bottom polarizer 413.

Figure 6:
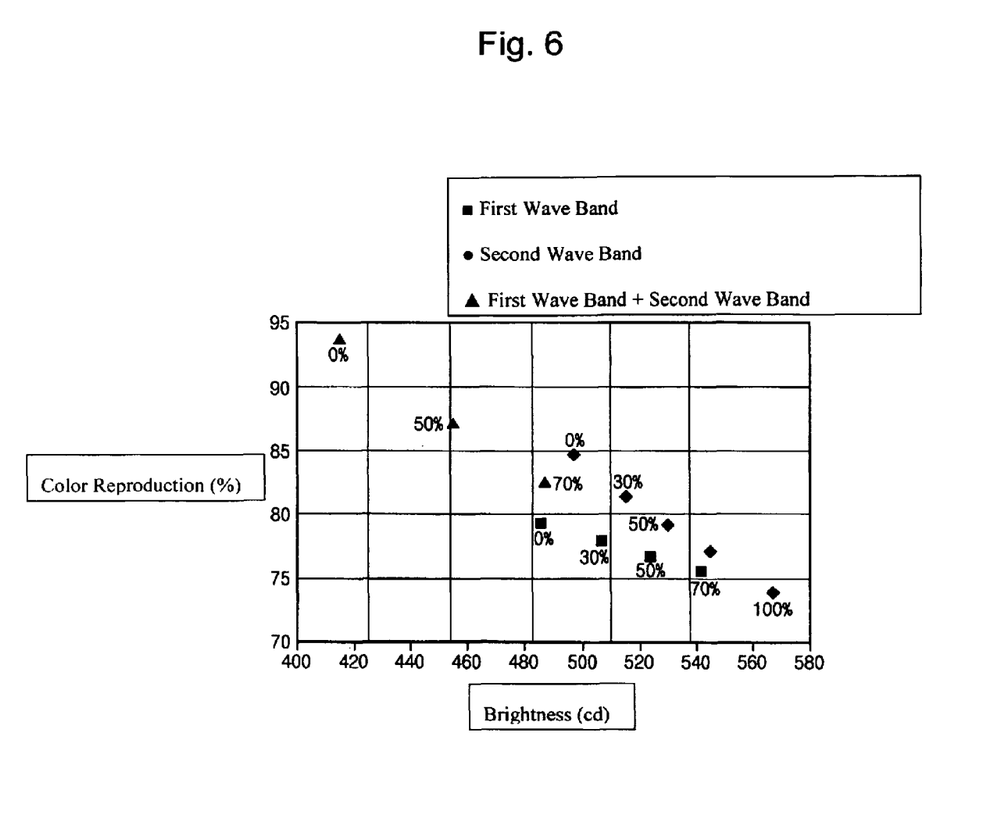
FIG. 6 is a graph showing an exemplary embodiment of color reproduction and brightness to the decreasing rate of the first wave band and the second wave band according to the present invention.

FIG. 6 is a graph showing an exemplary embodiment of color reproduction and brightness to the decreasing rate of the first wave band and the second wave band according to the present invention. In FIG. 6, the first wave band has the wave length between about 470 nm and 530 nm and the second wave band has the wave length between about 572 nm and 605 nm.

With reference to FIG. 6, if the first and second wave bands are not filtered (e.g. 100%), the color reproduction is about 74% and the brightness is about 570 cd.

If the first wave band is reduced to 70%, 50%, 30%, and 0% by filtering, the color reproduction is increased and the brightness is decreased.

If the second wave band is reduced to 70%, 50%, 30%, and 0% by filtering, the color reproduction is increased and the brightness is decreased as well.

However, in the case of filtering the second wave band, the color reproduction is more increased and the brightness is less decreased.

If the first and second wave band is reduced to 70%, 50%, 30%, and 0% by filtering at the same time, the color reproduction is significantly increased and the brightness is decreased. In the case of filtering the first and second wave band, the color reproduction is the most increased.

As shown in FIG. 6, depending on the rate of filtering, the brightness is decreased but the color reproduction is significantly increased. In one exemplary embodiment, in the case of reducing the first and second wave band at the same time, if the color reproduction achieves up to 90%, the brightness is decreased to about 75%. This decreasing rate of the brightness is substantially the same to that of using a high color reproduction lamp. Advantageously, the disclosed invention achieves substantially the same level of high color reproduction with a conventional lamp.

Although the illustrative embodiments have been described herein with reference to the accompanying drawings, it is understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An optical sheet comprising:
    a reflective polarizer reflecting a part of incident light and transmitting another part of said incident light; and
    a filter layer selectively reflecting a transmitted light generated by the transmitting said another part of said incident light,
    wherein said filter layer reflects a first wave band and a second wave band,
        the first wave band being in a portion of an area between a green peak and a blue peak in the spectrum of said incident light where green wavelengths and blue wavelengths are overlapped with each other, excluding a remaining portion of the area between the green peak and the blue peak where the green wavelengths and the blue wavelengths are not overlapped with each other; and
    the second wave band being in a portion of an area between the green peak and a red peak in the spectrum of said incident light where the green wavelengths and red wavelengths are overlapped with each other, excluding a remaining portion of the area between the green peak and the red peak where the green wavelengths and the red wavelengths are not overlapped with each other.

2. The optical sheet of claim 1, wherein said first wave band comprises a wavelength between 470 nm and 530 nm and said second wave band comprises a wavelength between 572 nm and 605 nm.

3. The optical sheet of claim 1, wherein said reflective polarizer reflects first linear polarized light and transmits second linear polarized light that is perpendicular to said first linear polarized light.

4. The optical sheet of claim 3, wherein said reflective polarizer and filter layer comprise a plurality of layers with different refractive indices.

5. The optical sheet of claim 4, wherein said reflective polarizer and said filter layer each comprise a transmission axis, the transmission axis of said filter layer being perpendicular to the transmission axis of said reflective polarizer.

6. The optical sheet of claim 5, wherein said filter layer is disposed over said reflective polarizer.

7. The optical sheet of claim 5, wherein said filter layer is disposed under said reflective polarizer.

8. The optical sheet of claim 1, wherein said reflective polarizer comprises a cholesteric liquid crystal layer.

9. The optical sheet of claim 1, wherein said reflective polarizer comprises a plurality of a liquid crystal layer, each liquid crystal layer corresponding to a wavelength of a color spectrum and alternately arranged with each of a plurality of a protection layer.

10. The optical sheet of claim 8, wherein a direction of a transmission axis of said filter layer is reverse to a direction of a transmission axis of said reflective polarizer.

11. The optical sheet of claim 10, wherein said filter layer is disposed on top of said reflective polarizer.

12. The optical sheet of claim 11, further comprising a phase shift layer changing circular polarized light passing through said filter layer to linear polarized light.

13. The optical sheet of claim 1, wherein said reflective polarizer and said filter layer are separated from each other into independent layers.

14. A display device comprising:
   a light source;
   an optical sheet comprising:
      a reflective polarizer transmitting a part of incident light from said light source; and
      a filter layer selectively reflecting a first wave band and a second wave band,
      the first wave band being in a portion of an area between a green peak and a blue peak in the spectrum of said incident light where green wavelengths and blue wavelengths are overlapped with each other, excluding a remaining portion of the area between the green peak and the blue peak where the green wavelengths and the blue wavelengths are not overlapped with each other, and
      the second wave band being in a portion of an area between the green peak and a red peak in the spectrum of said incident light where the green wavelengths and red wavelengths are overlapped with each other, excluding a remaining portion of the area between the green peak and the red peak where the green wavelengths and the red wavelengths are not overlapped with each other;
   a display panel disposed on said optical sheet;
   a top polarizer disposed on a top of said display panel; and
   a bottom polarizer disposed on a bottom of said display panel.

15. The display device of claim 14, wherein said reflective layer and filter layer comprises a plurality of thin films with a different refractive index; and
   said reflective polarizer reflects first linear polarized light and transmits second linear polarized light that is perpendicular to said first linear polarized light.

16. The display device of claim 15, wherein a transmission axis of said filter layer is perpendicular to a transmission axis of said reflective polarizer.

17. The display device of claim 16, wherein the transmission axis of said reflective polarizer is parallel to a transmission axis of said bottom polarizer.

18. The display device of claim 14, wherein said reflective polarizer comprises a cholesteric liquid crystal layer.

19. The display device of claim 18, wherein a direction of a transmission axis of said filter layer is reverse to a direction of a transmission axis of said reflective polarizer.

20. The display device of claim 19, further comprising a phase shift film changing circular polarized light passed through said filter layer to linear polarized light.

21. The display device of claim 20, wherein a polarizing axis of said phase shift film is parallel to a transmission axis of said bottom polarizer.

22. A method of forming a display device comprising:
   disposing an optical sheet on a light source, said optical sheet comprising:
      a reflective polarizer transmitting a part of incident light from said light source; and
      a filter layer selectively reflecting a first wave band and a second wave band,
      the first wave band being in a portion of an area between a green peak and a blue peak in the spectrum of said incident light where green wavelengths and blue wavelengths are overlapped with each other excluding a remaining portion of the area between the green peak and the blue peak where the green wavelengths the and the blue wavelengths are not overlapped with each other, and
      the second wave band being in a portion of an area between the green peak and a red peak in the spectrum of said incident light where the green wavelengths and red wavelengths are overlapped with each other, excluding a remaining portion of the area between the green peak and the red peak where the green wavelengths and the red wavelengths are not overlapped with each other.
   disposing a display panel on said optical sheet;
   disposing a top polarizer on a top of said display panel; and
   disposing a bottom polarizer on a bottom of said display panel.

* * * * *